Feb. 6, 1973   E. A. G. HAMER   3,715,036
TUBULAR OSMOTIC MEMBRANE
Original Filed Nov. 16, 1965
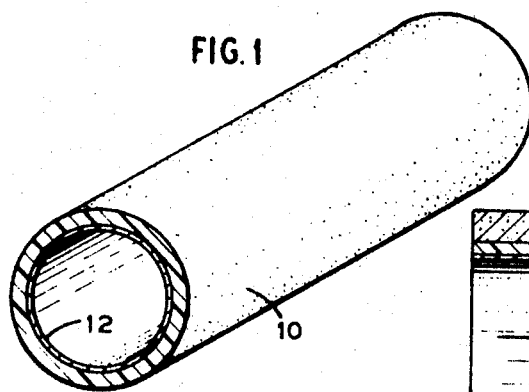
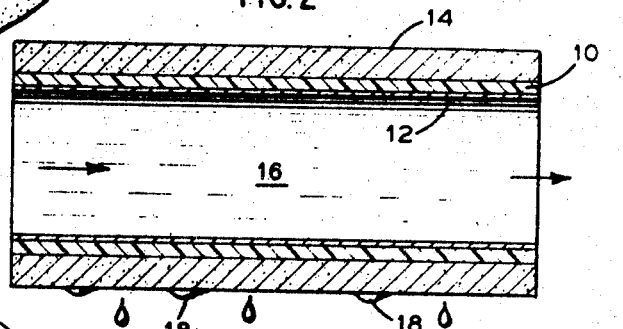
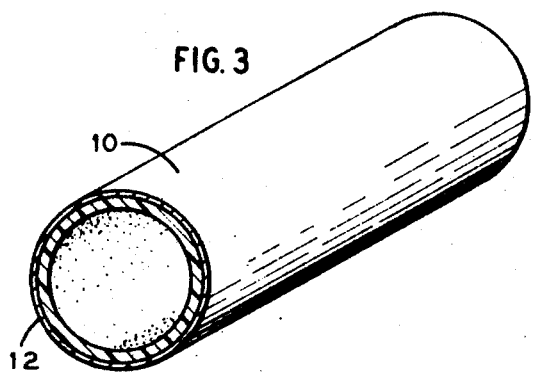
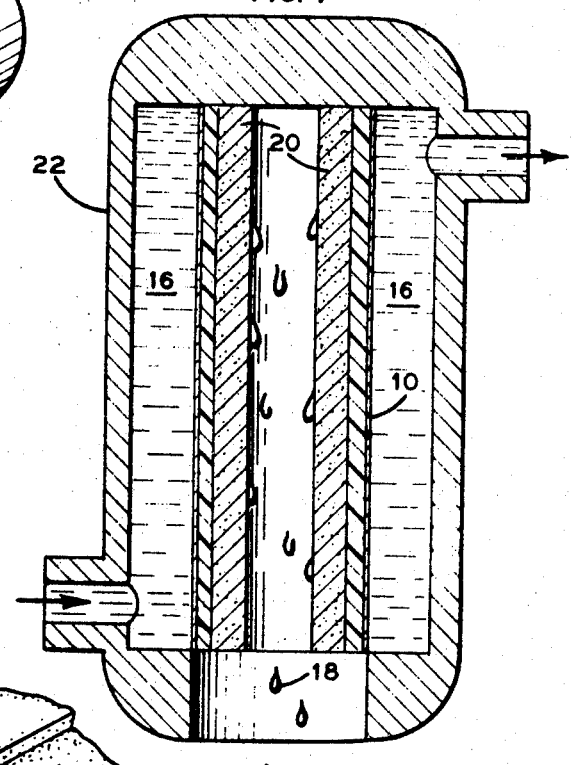
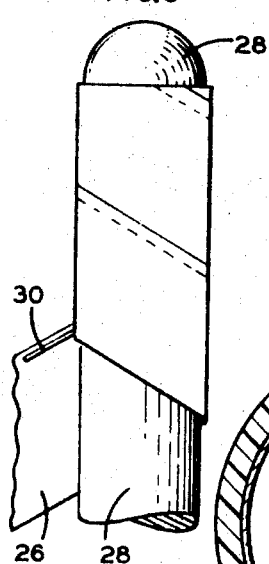
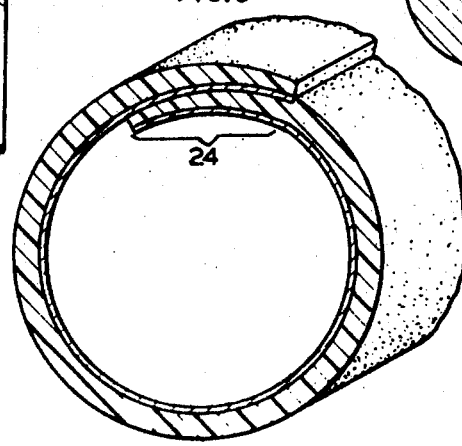
INVENTOR
Edward A.G. Hamer
BY Eli Weiss
ATTORNEY United States Patent Office 3,715,036
Patented Feb. 6, 1973

3,715,036
TUBULAR OSMOTIC MEMBRANE
Edward A. G. Hamer, 7 Elm Court, Metuchen, N.J.
Continuation of applications Ser. No. 508,052, Nov. 16, 1965, and Ser. No. 1,982, Jan. 12, 1970, both now abandoned. This application July 15, 1971, Ser. No. 165,791
Int. Cl. B01d 31/00
U.S. Cl. 210—321
24 Claims

ABSTRACT OF THE DISCLOSURE

A reverse osmosis purification system in which the osmotic membrane is formed from a flat membrane which is curled and lap seamed. An adhesive is employed to seal the lap seam. The adhesive does not permanently bond together the lapped surfaces of the membrane until after the membrane is positioned in contact with the support tube and fluid pressure is applied to force the membrane into firm and conforming contact with the support member.

This application is a continuation of my earlier co-pending applications Ser. No. 1,982 filed Jan. 12, 1970, Ser. No. 751,648, filed June 25, 1968 and Ser. No. 508,052 filed Nov. 16, 1965 all now abandoned.

This invention relates to osmotic or semi-permeable membranes. In particular, this invention relates to such membranes in a tubular form rendering them particularly useful as components in desalination apparatus and the like, and to methods for preparing such tubular membranes.

Osmotic membranes, or semi-permeable membranes, are used in a variety of applications where it is desired to effect a separation between a solvent and a solute dissolved therein. One such application, of great current interest, is the desalination of sea water and brackish waters.

According to conventional techniques, such membranes are formed as flat sheets, and they are used in apparatus wherein the osmotic membrane is supported by a flat porous structure, and brine under pressure is put in contact with the side of the membrane away from the support. If the applied pressure on the brine side of the membrane is greater than the osmotic pressure of the brine solution, "reverse osmosis" takes place, water passing from the brine solution through the membrane and the porous support to a collector, leaving dissolved salts behind in the brine solution, which becomes more concentrated.

Reverse osmosis, as a technique for purifying saline water and other solutions, has been known for years, but has not been effectively utilized in many practical applications because the osmotic membranes available, until recently, were incapable of transmitting a sufficiently large flow of purified water, even when subjected to very high pressures. More recently, greatly improved membranes have become available.

Even with such improved membranes, it has proven difficult to provide a workable commercial apparatus for the desalination of sea water or brackish waters. One of the principal difficulties involved in the design of such apparatus is the necessity of containing the very considerable working pressures involved. This is readily understood when it is considered that the osmotic pressure of sea water (approximately 3.5% NaCl) is about 340 p.s.i. Thus, until the pressure on the brine side of the membrane exceeds that on the fresh water side by 340 p.s.i. any flow through the membrane will be in the direction opposite to that desired. Even when the pressure on the brine side exceeds 340 p.s.i., the driving force for desalted water transfer is only that amount by which that figure is exceeded. In order to produce purified water at a practical rate, it is necessary to increase the effective driving force by resorting to considerably higher pressures, and working pressures as high as 1500 p.s.i. are commonly employed.

In order to contain these large working pressures, it has been necessary to enclose the brine solution in strong chambers with elaborate seals to prevent brine from leaking into the purified water collection channels. One or more walls of each chamber is made up at least in part by an osmotic membrane backed by a porous support member. The osmotic membrane is ordinarily a thin film having a thickness of only a few thousandths of an inch so that it is far too weak to withstand the large forces associated with the brine solution at the high pressures just referred to. Thus, the porous support members must be sufficiently strong or additionally sustained to withstand these forces. Similarly, the structural members forming the other walls of the brine chambers must be strong. These requirements become increasingly severe as the equipment is scaled up, making the design of commercial-sized equipment exceedingly intricate and, therefore, expensive.

One way in which the design of pressure vessels can be simplified is to make them in shapes that are inherently strong because of the manner in which they distribute stresses. One such shape is that of a cylindrical tube. The use of tubular designs for reverse-osmosis separation chambers has not heretofore been proposed however. Such a proposal would, in fact, have been impracticable, for lack of a suitable membrane. It has been found that cylindrical membranes prepared by methods similar to those used for preparing conventional flat membranes exhibit a loss of selectivity, i.e., the ability of a membrane to transmit solvent (water) preferentially to solute (salt).

An object of this invention, therefore, is to provide improved osmotic membranes.

Another object is to provide membranes in cylindrical form.

Still another object is to provide cylindrical osmotic membranes having high selectivity combined with high permeability to pure water.

A feature of the invention is the preparation of a freshly-cast osmotic membrane.

Another feature is the partial drying of said freshly-cast membrane by exposing it to air.

Still another feature is the immersion of said partially dried membrane, in cold water for a predetermined period of time.

A further feature resides in imparting to said membrane a tubular configuration.

Another feature is the annealing of said membrane, while maintained in said tubular configuration, by immersing the same in hot water for a predetermined period of time.

Other objects, features and advantages will become apparent from the following more complete description and claims, and by reference to the accompanying drawings.

In one particularly desirable embodiment, this invention contemplates an osmotic membrane in the form of a hollow tube consisting essentially of cellulose acetate.

In another particularly desirable embodiment, this invention contemplates a process for preparing a tubular osmotic membrane, comprising in combination the steps of preparing a freshly-cast film consisting essentially of cellulose acetate, partially drying said film, soaking said film in cold water, imparting a tubular configuration to said film, and subsequently annealing said film by soaking the same in hot water while maintaining said tubular configuration.

The method of this invention is applicable to any type of osmotic film which is capable of being cast as a self-supporting film and subsequently annealed in a desired configuration by soaking in hot water. However, films consisting essentially of cellulose acetate are preferred, and the invention will be described primarily with reference to such films. In particular, freshly-cast films prepare from solutions containing cellulose acetate, magnesium perchlorate, water and acetone are especially good starting materials for use in the process of this invention. Such films may be prepared, for example, by drawing down with a doctor knife, to a thickness of 0.010 inch, a solution containing 22% cellulose acetate, 1% magnesium perchlorate, 10% water and 67% acetone, by weight. Both the apparatus and the solution are chilled to a temperature between about −15 and +5° C. before casting.

Following the casting operation, the film, on the glass plate or other surface on which it was cast, is kept cold and allowed to partially air dry for a period between 10 seconds and 5 minutes and then immersed in cold water (for example, at 1° to 5° C.), and then in warm water between 60° and 85° C., and then cooled.

The process of the present invention, in its preferred embodiment, differs from that just described, in a number of aspects. The preferred casting composition is somewhat different from that just described, as will be more fully set forth below. Also, after partially air-drying and then immersing in cold water, there is interposed an additional step of removing the film from the casting plate and imparting to it a tubular configuration.

The curling operating is preferably carried out by wrapping the film around a mandrel of suitable diameter, comparable to the diameter desired in the finished tubular membrane. After the curled film is thus annealed, a sufficient width is unwound from the mandrel and slit along its length, so that the opposing edges of the strip which is removed overlap when curled to the desired diameter.

The procedure differs slightly, depending on whether the membrane is to be used as a liner in a porous support tube through which brine is circulated, or as an outer covering on a porous support tube around which brine circulates. In the procedure referred to above, wherein the film is cast on a glass plate or the like and partially air-dried while still supported on the plate, there is a marked difference in properties of the two faces of the film, and the air-dried face is primarily responsible for the selectivity or semi-permeability of the membrane. The air-dried or "good" face of the membrane must be facing the brine solution for optimum selectivity. Therefore, if the tubular membrane is to be used as a liner in a porous supporting tube which will be filled with brine under pressure, the tubular configuration should be imparted to it by wrapping it around a mandrel with the "good" side in, facing the mandrel. Conversely, if the tubular membrane is to be placed on the outside of a cylindrical supporting member, and immersed in the brine solution, the membrane should be curled by wrapping it about the mandrel with the "good" side out.

Referring now to the figures:

FIG. 1 is a perspective view of a tubular membrane according to one embodiment of the invention.

FIG. 2 is a cross-sectional view of an assembled cartridge, containing the membrane of FIG. 1 inserted as a liner into a suitable porous tubular support.

FIG. 3 is a perspective view of a tubular membrane according to another embodiment of the invention, having the "good" side facing outwardly.

FIG. 4 is a cross-sectional view of a portion of a purification system, utilizing the membrane of FIG. 3 wrapped about a tubular support member and surrounded by brine under pressure.

FIG. 5 is a view in elevation of a membrane according to another embodiment of the invention, being formed in place on a mandrel.

FIG. 6 is a perspective view of the membrane of FIG. 1, on a larger scale, showing certain additional details.

Referring more particularly to FIG. 1, the tubular osmotic membrane according to the illustrated embodiment is an open-ended cylinder 10 of suitable osmotic membrane material such as cellulose acetate, with the selective "good" side represented as a thin internal surface layer 12. Such a membrane is designed to be externally supported by enclosing it in a porous cylindrical support 14, as shown in FIG. 2. The support 14 may be made of any suitable porous, structurally strong material such as unglazed ceramic, sintered metal powder, etc. In practice, it is preferred to use a woven, reinforced glass fiber tube. When brine 16 under pressure is passed through the center of such a tubular assembly as indicated by the arrows, a portion of the water solvent, free or substantially free of dissolved salts, passes through the walls of the cylinder by reverse osmosis, collects as drops 18 on the outer surface of the support tube, and drops off into a suitable collector (not shown).

FIG. 3 illustrates another embodiment of the invention, which is similar to that of FIG. 1 except that the "good" side is on the outer surface of the tube. This type of tubular membrane is to be used as a sleeve surrounding a cylindrical support member, and immersed in the pressurized brine solution so that purified water diffuses through the membrane into the support member. Apparatus for making use of such an assembly is illustrated somewhat diagrammatically in FIG. 4, wherein the cylindrical membrane 10 is supported from within by a cylindrical support member 20. The support member 20 may be a hollow porous tube, as shown, or if desired may be a solid, porous cylinder. Brine 16 under working pressure is circulated through a pressurized jacket 22 as indicated by the arrow. Purified water diffuses through the membrane and porous support 20 and collects as drops 18 on the internal walls of the support member, whence it falls into a suitable collector (not shown).

In the preferred embodiment of the invention, the original film is cast in, or trimmed to, the shape of a rectangle, and wrapped around the mandrel with one pair of edges parallel to the longitudinal axis of the mandrel so that a curled section cut from the membrane, after annealing, is in the form of a split cylinder, with the split running straight down the wall of the cylinder, parallel with its longitudinal axis. This configuration gives the shortest possible seam.

Assuming that the membrane has been curled with the "good" side inward, for eventual use as a lining for a support member (FIGS. 1 and 2), one or both of the edges to be overlapped is coated with a layer of adhesive. The membrane is then slipped into the support tube, and a moderate pressure is applied to seat the membrane against the inside walls of the support member and distribute the adhesive over the overlapping area. This is most conveniently done by inserting an elastomeric tube within the curled membrane and pressurizing it, pneumatically or hydraulically, to expand the elastomeric tube, thus pressing the membrane against the walls of the support member. In the process, the seam 24 is formed as illustrated in FIG. 6. Details of the seam have been omitted from FIGS. 1–4 for the sake of clarity. The adhesive must not form a permanent bond during the previous operation so that the seam may slip to accommodate additional stretching forces when it is subjected to desalination operating pressures. Further desirable properties of the adhesive are that it binds the membrane material effectively and does not contaminate the desalted water. For cellulose acetate membranes, for example, suitable adhesives include aqueous polyvinyl alcohol, Pliobond (Goodyear Tire and Rubber Company) and Super Cement (Du Pont Company).

An alternate method of fabricating the tubular membranes of this invention is shown in FIG. 5. As shown in FIG. 5, the membrane is precut to the form of a strip 26 and wrapped helically about the mandrel 28, with each turn of the helix overlapping its predecessor by a small predetermined amount. A bead 30 of adhesive is applied along one of the edges thus overlapped, either prior to winding or concurrently with the winding operation. The winding may be one making several turns, as shown, or one such that the seam makes only one turn about the circumference of the cylinder as it goes from end to end of the finished tubular membrane.

In all of the drawings, it should be understood that the thickness of the membrane is greatly exaggerated relative to the other elements shown, and that the actual membranes are only a few thousandths of an inch in thickness. Also, while the "good" or air-dried side of the membrane has been shown as a distinct surface layer, it is not visible as such to the naked eye, although differences in the characteristics of the two faces of the membrane can be detected by electron photomicrographs and other means. Moreover, many details such as sealing rings, threaded connections and the like have been omitted in the interest of emphasizing the essential features.

When the membrane is to be used as an outer covering on the support surface (FIGS. 3 and 4), the support member itself may be used as the mandrel if so desired and the support member with the membrane wrapped upon it, either as a split cylinder (FIG. 6) or a helix (FIG. 5) may then be immersed in hot water to anneal the membrane in the curled configuration. Otherwise, the membrane (for example in the form of a split cylinder) may be annealed on the mandrel, with the air-dried or "good" side out, and wrapped about the support member with edges overlapping. One or both of the overlapping surfaces are then coated with adhesive and the two surfaces are pressed together.

The nature of the adhesive is a matter of some importance. The adhesive must be effective to seal the joint between the overlapping edges of the membrane, so as to prevent leakage of brine through the seam into the purified water channels. As noted above, however, a waterproof adhesive which hardens to a rigid structure before brine pressure is applied is unsuitable. When the tubular membrane is inserted into the support tube, it is necessarily at least slightly smaller in diameter than the inside diameter of the support tube. Also, if, despite all precautions, there remain some irregularities in the inside surface of the support tube, the membrane must conform itself to these as pressure is applied. For both reasons, the application of brine pressure results in circumferential stresses tending to enlarge the diameter of the tubular membrane. In order to avoid stretching of the membrane itself in response to these stresses, the adhesive should permit the overlapping portions of the membrane to slide one over the other without breaking the seal. Such sliding action causes the seam to function as an expansion joint, absorbing the stresses which would otherwise tend to stretch the membrane, resulting in loss of selectivity.

Three techniques can be used to effect the sealing of the overlapping membrane area without destroying membrane properties:

(a) An adhesive can be applied to the overlapped area which will not permanently bond during either its application or the seating of the membrane against the porous tube. The adhesive may or may not form a permanent bond after full brine pressure is applied. All that is required of this type of adhesive is that it prevent the brine solution under pressure from seeping between the layers of the overlap. An example of such an adhesive is a viscous solution of aqueous polyvinyl alcohol.

(b) An adhesive which forms a permanent bond to the membrane before it is put under pressure may be used, if the mechanical properties of the adhesive are such that it will stretch under the applied pressure, in preference to any strain undergone by the membrane itself. Low modulus elastomers may be used as this type of adhesive.

(c) Adhesives which bond permanently before the brine pressure is applied may also be used if, in seating the membrane against the porous tube, a pressure is applied which is equal to or greater than the brine pressure to be subsequently used. If this is done, the overlap will open up sufficiently during the seating process so that there will be no further strain either on it or on the membrane when the brine pressure is applied. An example of such an adhesive is E. I. du Pont de Nemours Company "Super Cement."

To further illustrate the nature of this invention and the manner of practicing the same, the following example is presented:

EXAMPLE

For an internal membrane, the sheet material was prepared by casting a 10 mil film with a doctor knife from a solution containing 23.15% cellulose acetate (Eastman E 398–3), 69.4% acetone, 1.65% magnesium perchlorate, 0.33% hydrochloric acid and 5.47% water. This operation was carried out with apparatus and solution pre-cooled to −9° C. Part of the solvent was allowed to evaporate by exposing the freshly cast film to air for 2 minutes in the same temperature range. After immersion in water at 1° C. for 1 hour, the film was removed from the casting plate and wrapped around a mandrel comparable in size to the bore of the support tube before being submerged in a hot water bath maintained at 73° C. for 15 minutes. During this step, the air exposed surface of the film faced the mandrel. In the course of this annealing step, the membrane acquired a permanent curl, so that it tended to retain a cylindrical, rather than a flat configuration, even when unsupported. A sufficient width of film was unwound from the mandrel and slit along its length resulting in a section which overlapped when curled to the desired diameter. The membrane was wrapped around an elastomeric tube, the outside diameter of which was slightly smaller in diameter than the inside diameter of the permanent support tube into which the membrane was to be placed. One of the overlapping surfaces of the membrane was coated with a thin layer of aqueous polyvinyl alcohol. The elastomeric tube and membrane assembly were inserted into the porous support tube and one end of the elastomeric tube clamped shut. Air pressure was applied to the other end of the elastomer tube, and the elastomeric tube was expanded sufficiently to bring the membrane into intimate contact with the porous support tube. The elastomeric tube was depressurized and removed, and the membrane remained in the porous support tube in intimate contact with it since the adhesive in the overlapped area of the membrane fixed the membrane into the larger diameter. The ends of the tube were then fitted with attachments which permitted it to be used in a desalination system.

The support tube with its membrane lining was then coupled into a high-pressure brine line circulating brackish water of 0.5% NaCl concentration under a pressure of 600 p.s.i. Purified water containing only 300 p.p.m. (.03%) NaCl was collected at a rate of 7.3 gallons per day per square foot of membrane area.

The composition of the casting solution may be varied to some degree. Thus, the casting solution is preferably about 23.15% cellulose acetate, but may be from about 15% to 25%. The preferred composition also contains about 69.5% acetone, but this may vary between about 60% and about 80%. Similarly, the content of magnesium perchlorate, preferably about 1.65% may range from about 1% to about 2%. Hydrochloric acid is not an essential component of the casting solution, but may be used in amounts up to about 1%, preferably about 0.33%. Water is also not essential, but is preferably present in amount about 5.47%. It may be present, as desired, in amounts up to about 20%. Variations outside the ranges just stated tend to produce membranes which are either deficient in physical properties such as tensile strength, or lacking in their functional properties such as selectivity and/or permeability to water.

While this invention has been described in terms of certain preferred embodiments and illustrated by way of certain drawings and examples, these are illustrative only, as many alternatives and equivalents will readily occur to those skilled in the art, without departing from the spirit or proper scope of the invention. The invention is therefore not to be construed as limited, except as set forth in the appended claims.

I claim:

1. In a reverse osmosis purification system, the improvement comprising: an osmotic membrane and a porous support tube, said membrane being wrapped helically with each turn of the helix overlapping its predecessor by a predetermined amount to form a tube, said overlapping turns being united by an adhesive in spatial relationship which renders said overlapping portions substantially free of tendency to slide relative to each other under the reverse osmosis working pressure applied to said membrane.

2. The reverse osmosis purification system of claim 1, wherein said membrane is positioned internally of said support tube.

3. The reverse osmosis purification system of claim 1, wherein said membrane consists essentially of cellulose acetate.

4. A reverse osmosis purification system comprising:
a fluid inlet for untreated fluid;
a porous support tube;
an osmotic membrane, said membrane having a pair of opposed edges, said opposed edges being united by a lap seam to form a hollow tube of said membrane, said lap seam being cemented by an adhesive material joining said opposed edges in the spatial relationship assumed by said edges under normal working pressures in the absence of said adhesive whereby said membrane is rendered substantially free of the internal strains which are encountered when the circumferential stresses of said working pressures upon said membrane are not relieved by said assumption of said spatial relationship, said membrane being in firm and conforming contact with a surface of said support tube; and
an outlet for treated fluid, said outlet and said inlet being in fluid tight engagement with opposite ends of said osmotic membrane and support tube, said membrane is permanently curled to preferentially assume a tubular configuration.

5. The reverse osmosis purification system of claim 4, wherein said membrane is positioned internally of said support tube.

6. The reverse osmosis purification system of claim 4, wherein said membrane consists essentially of cellulose acetate.

7. The reverse osmosis purification system of claim 4, further comprising a fluid to be treated in said system, and means for applying a pressure considerably in excess of 340 pounds per square inch to said fluid in said system, wherein said fluid pressure causes said membrane to be in firm and conforming contact with said surface of support tube.

8. In a reverse osmosis purification system, the improvement comprising: an osmotic membrane, and a porous support tube, said membrane being wrapped helically with each turn of the helix overlapping its predecessor by a predetermined amount to form a tube, said overlapping turns being united in sealing spatial relationship which renders said overlapping portions substantially free of tendency to slide relative to each other under the reverse osmosis working pressure applied to said membrane.

9. The reverse osmosis purification system of claim 8, wherein said membrane is positioned internally of said support tube.

10. The reverse osmosis purification system of claim 8, wherein said membrane consists essentially of cellulose acetate.

11. The reverse osmosis purification system of claim 8, wherein said membrane is positioned externally of said support tube.

12. The reverse osmosis purification system of claim 8, wherein the overlapping turns are united by an adhesive.

13. The reverse osmosis purification system of claim 12, wherein the adhesive will not permanently bond either when the overlapping portions of the membrane are initially united or under the working pressure of the system.

14. The reverse osmosis purification system of claim 13, wherein the adhesive is an aqueous polyvinyl alcohol.

15. The reverse osmosis purification system of claim 12, wherein the adhesive is a low modulus elastomer which forms a permanent bond with the overlapping portions of the membrane upon application, such adhesive adapted to stretch under the working pressure of the system.

16. In a reverse osmosis purification system, the improvement comprising: an osmotic membrane, and a porous support tube, said membrane being wrapped helically with each turn of the helix overlapping its predecessor by a predetermined amount to form a tube, said overlapping turns being united by an adhesive in spatial relationship which renders said overlapping portions substantially free of tendency to slide relative to each other under the reverse osmosis working pressure applied to said membrane, and said wound membrane is positioned externally of the support tube.

17. A reverse osmosis purification system comprising:
a fluid inlet for untreated fluid;
a porous support tube;
an osmotic membrane, said membrane having a pair of opposed edges, said opposed edges being united by a lap seam to form a hollow tube of said membrane, said lap seam being sealed in the spatial relationship assumed by said edges under normal working pressures in the absence of said adhesive whereby said membrane is rendered substantially free of the internal strains which are encountered when the circumferential stresses of said working pressures upon said membrane are not relieved by said assumption of said spatial relationship, said membrane being in firm and conforming contact with a surface of said support tube; and
an outlet for treated fluid, said outlet and said inlet being in fluid tight engagement with opposite ends of said osmotic membrane and support tube, said membrane is permanently curled to preferentially assume a tubular configuration.

18. The reverse osmosis purification system of claim 17, wherein said membrane is positioned internally of said support tube.

19. The reverse osmosis purification system of claim 17, wherein said membrane consists essentially of cellulose acetate.

20. The reverse osmosis purification system of claim 17, further comprising a fluid to be treated in said system, and means for applying a pressure considerably in excess of 340 pounds per square inch to said fluid in said system, wherein said fluid pressure causes said membrane to be in firm and conforming contact with said surface of support tube.

21. The reverse osmosis purification system of claim 17, wherein the opposed edges are united by an adhesive.

22. The reverse osmosis purification system of claim 17, wherein the adhesive will not permanently bond either during the application or the setting of the membrane tube.

23. The reverse osmosis purification system of claim 22, wherein the adhesive is an aqueous polyvinyl alcohol.

24. The reverse osmosis purification system of claim 17, wherein the adhesive is a low modulus elastomer which forms a permanent bond to the membrane upon application, such adhesive adapted to stretch under the applied pressure.

References Cited

"New Osmotic Process of Saline Water Conversion," from Water and Water Engineering, October 1964.

Office of Saline Water R. & D. Progress Report No. 86, received in patent office Apr. 10, 1964.

FRANK A. SPEAR, JR., Primary Examiner

U.S. Cl. X.R.

210—433, 489, 497.1